United States Patent
Iino et al.

(10) Patent No.: US 8,543,248 B2
(45) Date of Patent: Sep. 24, 2013

(54) SYSTEM FOR MANAGING ENERGY AT LOADS

(75) Inventors: Yutaka Iino, Kawasaki (JP); Yasuhiro Taguchi, Saitama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 676 days.

(21) Appl. No.: 12/694,663

(22) Filed: Jan. 27, 2010

(65) Prior Publication Data

US 2010/0222934 A1    Sep. 2, 2010

(30) Foreign Application Priority Data

Mar. 2, 2009    (JP) ................................. 2009-048117

(51) Int. Cl.
G05D 3/12    (2006.01)
G05D 5/00    (2006.01)
G05D 9/00    (2006.01)
G05D 17/00    (2006.01)

(52) U.S. Cl.
USPC ............................ 700/291; 700/297; 700/298

(58) Field of Classification Search
USPC ......................................... 700/291, 297, 298
See application file for complete search history.

(56) References Cited

U.S. PATENT DOCUMENTS

| | | | |
|---|---|---|---|
| 6,285,917 B1 * | 9/2001 | Sekiguchi et al. | 700/239 |
| 6,633,823 B2 * | 10/2003 | Bartone et al. | 702/57 |
| 6,665,590 B2 * | 12/2003 | Harada et al. | 700/291 |
| 7,873,441 B2 * | 1/2011 | Synesiou et al. | 700/286 |
| 7,885,917 B2 * | 2/2011 | Kuhns et al. | 706/48 |
| 8,019,697 B2 * | 9/2011 | Ozog | 705/412 |
| 8,068,938 B2 * | 11/2011 | Fujita | 700/295 |
| 8,352,083 B2 * | 1/2013 | Ng | 700/276 |
| 2003/0083788 A1 * | 5/2003 | Harada et al. | 700/291 |
| 2004/0024483 A1 * | 2/2004 | Holcombe | 700/122 |
| 2004/0254899 A1 * | 12/2004 | Abe et al. | 705/412 |
| 2005/0015283 A1 | 1/2005 | Iino et al. | |
| 2006/0155423 A1 * | 7/2006 | Budike, Jr. | 700/286 |
| 2007/0220907 A1 * | 9/2007 | Ehlers | 62/126 |
| 2008/0167756 A1 * | 7/2008 | Golden et al. | 700/297 |
| 2010/0064001 A1 * | 3/2010 | Daily | 709/203 |
| 2011/0060476 A1 * | 3/2011 | Iino et al. | 700/297 |
| 2011/0202467 A1 * | 8/2011 | Hilber et al. | 705/80 |

FOREIGN PATENT DOCUMENTS

| | | |
|---|---|---|
| CN | 1416214 A | 5/2003 |
| CN | 1874105 A | 12/2006 |
| EP | 1 134 508 A2 | 9/2001 |
| EP | 1 372 238 A1 | 12/2003 |
| EP | 1 729 223 A2 | 12/2006 |
| GB | 2 408 592 A | 11/2003 |
| JP | 2002-176729 | 6/2002 |

(Continued)

OTHER PUBLICATIONS

English translation of Japan Patent Application Publication No. 2007-129873; printed from JPO on Jun. 3, 2012.*

(Continued)

*Primary Examiner* — Ronald Hartman, Jr.
(74) *Attorney, Agent, or Firm* — Finnegan, Henderson, Farabow, Garrett & Dunner, LLP (57) ABSTRACT

According to one embodiment, an energy management system is provided, which has the DSM function of controlling energy loads. The system has a database and a load adjustment range prediction unit. The unit predicts a load adjustment range by using the history data stored in the database and outputs the load adjustment range thus predicted.

9 Claims, 8 Drawing Sheets (56) References Cited

FOREIGN PATENT DOCUMENTS

| | | |
|---|---|---|
| JP | 2002-245126 | 8/2002 |
| JP | 2002-271981 | 9/2002 |
| JP | 2006-340461 | 12/2006 |
| JP | 2007-129873 | 5/2007 |
| JP | 2008-289276 | 11/2008 |
| WO | WO 02/27620 A1 | 4/2002 |

OTHER PUBLICATIONS

English translation of Japan Patent Application Publication No. 2008-289276; printed from JPO on Jun. 3, 2012.*

English translation of Japan Patent Application Publication No. 2006-340461; printed from JPO on Jun. 3, 2012.*

Japanese Patent Office Notice of Reasons for Rejection in Counterpart Application No. 2009-048117 dated Sep. 28, 2010 (4 pgs. total).

Palensky, P. et al., "Demand Side Management in Private Homes by Using LonWorks," *IEEE*, (1997), pp. 341-347 (7 pgs.).

European Patent Office Search Report dated Jul. 2, 2010 (10 pgs.).

Chinese Patent Office Office Action in Counterpart Application No. 201010005403.7 dated Jan. 1, 2013 (16 pgs. total).

\* cited by examiner

FIG. 1

| Date | Meteorological conditions | Calendar remark | Load name | On time | Off time | Use periods | Load factor | Adjusted/not adjusted | Adjustment |
|---|---|---|---|---|---|---|---|---|---|
| 08/11/24 | Cloudy, temperature: 15° C, humidity: 50% | Day off for working on a holiday | Air conditioner | 8:00 | 22:00 | 14 hours in total 8:00 – 12:00 at 22° C 12:00 – 16:00 at 21° C 16:00 – 22:00 at 23° C | | Adjusted | 14:00 – 16:00 Load upper limit: 60% Adjusted as demanded |
| ... | ... | ... | ... | ... | ... | ... | ... | ... | ... |

| Equipment name | Adjustment of use start time | Adjustment of use load | Effect | Inconvenience degree |
|---|---|---|---|---|
| Laundry | 8:00 → 5:00 | Not performed | Used at night rate | No inconvenience (level 0) |
| Dishwasher | 13:00 → 23:00 | Not performed | Used at night rate | No inconvenience (level 0) |
| Electric water heater | 17:00 → 18:00 | Load: 100% → 60% | Peak cut Peak cut | Bath time changed (level 1) |

F I G. 8

SYSTEM FOR MANAGING ENERGY AT LOADS

CROSS-REFERENCE TO RELATED APPLICATIONS

This application is based upon and claims the benefit of priority from prior Japanese Patent Application No. 2009-048117, filed Mar. 2, 2009, the entire contents of which are incorporated herein by reference.

BACKGROUND OF THE INVENTION

1. Field of the Invention

The present invention relates to a system designed to manage energy (e.g., electric power or heat) at loads. More particularly, the invention relates to a technique of adjusting energy loads.

2. Description of the Related Art

In recent years, energy management systems have been proposed for use in buildings, factories, infrastructure and houses in order to increase the use efficiency of energy, such as electric power or heat. The energy management system includes a supply-and-demand control technique of using reproducible energy such as wind- or solar-generated power, together with the basic electric power, and matching the power generated with the power consumed. Further, energy supply systems, each including non-utility generation units, fuel cells and power storage devices (i.e., storage batteries), and methods of operating these systems have been proposed, too.

These systems are attracting attention as power supply system known as microgrid. A microgrid supplies not only the basic electric power, but also the power provided from equipment pieces such as solar generation units, wind generation units, batteries and fuel cells, and are used in accordance with the predicted demands and predicted supplies.

The microgrid is a system that predicts a demand for energy such as electric power or heat and also a demand for power that may be generated in uncontrollable generation equipment such as wind generation units and solar generation units. (That is, the microgrid performs both demand prediction and supply prediction.) In this system, the non-utility generation units, fuel cells and power storage devices (e.g., batteries) are so used or controlled in real time in order to matching the power generated with the power consumed. As a prior-art example of this system, an energy management system has been proposed, which has the ordinary demand prediction function of predicting the energy to consume and the supply optimization function of formulating an energy accumulation schedule. (See, for example, Jpn. Pat. Appln. KOKAI Publication No. 2002-245126.)

However, the microgrid does not control energy loads. It controls only equipment pieces, such as the non-utility generation units, fuel cells and power storage devices (e.g., batteries). Its adjusting ability and its installation cost should therefore be traded off. In the supply-and-demand control the microgrid performs, the predicted power demanded at each load is based primarily on the use of the load, not taking the desirable load adjustment into account. Consequently, the adjustment is greatly limited in the supply-and-demand control and in the system use planning. This will ultimately jeopardize the actual system operation. To solve this problem, the system tends to include an excessive number of equipment pieces, such as non-utility generation units, fuel cells and power storage devices (i.e., storage batteries).

On the other hand, systems having a demand-side management (DSM) or a demand-side control (DSC) function (i.e., load control or load adjustment), which controls energy load equipment pieces, are now attracting attention. More precisely, the system has the function of setting power rates to promote the adjustment of loads. (See, for example, JPN. Pat. Appln. KOKAI Publication No. 2002-271981.) In this system, the consumers voluntarily adjust the loads in accordance with the power rate, accomplishing indirect load adjustment. As a system having the function of adjusting loads, an indirect load adjusting system is proposed, which adjusts the power rate, thus incentivize people to adjust the loads. (See, for example, Jpn. Pat. Appln. KOKAI Publication No. 2002-176729.)

To achieve demand-side management (DSM) in any energy management system having the DSM function, the overall power load must be limited for a forced load shutdown (selective load shutdown) and the load leveling must be performed by using the load outside any peak use period, that is, by shifting the load use period. In order to take these measures appropriately, a priority order in which to shutdown the loads and a specific rule of adjusting loads should be predetermined. This is a forced method, in which the conditions at any load are neglected. In other words, no energy management system is implemented to adjust the loads effectively in accordance with the energy required at the loads or with the conditions of the loads.

BRIEF SUMMARY OF THE INVENTION

An object of this invention is to provide a system for managing energy at loads, which can effectively adjust loads in accordance with the energy required at the loads and conditions of the loads, thereby leveling the energy demanded at the loads and optimizing the energy use efficiency.

According to an aspect of the invention, there is provided an energy management system having DSM function (or load control or load adjustment), which controls energy loads, more particularly an energy management system that has the function of predicting the range in which to adjust the loads.

An energy management system according to an aspect of this invention comprises: a database configured to store history data about load adjustment; a demand prediction unit configured to predict a demand at a load to which energy is supplied; a load adjustment range prediction unit configured to predict a load adjustment range by using the history data stored in the database; and a display unit configured to display the demand predicted by the demand prediction unit and the load adjustment range predicted by the load adjustment range prediction unit.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

An embodiment of this invention will be described with reference to the accompanying drawings.
(Configuration of the System)
FIG. 1 is a block diagram showing the major components of an energy management system according to an embodiment of this invention.

The system according to the embodiment is applied to a home server that manages energy such as electric power or heat and monitors the energy consumption in, for examples, homes, or to a server installed in a monitoring center that monitors the power consumption in remote buildings and factories. The energy management system according to the embodiment controls energy at the loads that consume energy (such as air conditioners) and has the function of predicting an energy load adjustment range (hereinafter referred to as "load adjustment range").

The load adjustment range is a parameter that specifically indicates the possibility of load adjustment, which can be determined from a predicted demand and a predicted optimal supply. The load adjustment range is defined by, for example, the power supplied to an air conditioner, the time of supplying power to the air conditioner and the timing of activating the air conditioner. The possibility of load adjustment is defined by the conditions in which the output of the air conditioner can be adjusted from the normal maximum value when, for example, the temperature in the room rises during the use of the air conditioner. A specific example of the load adjustment range is a range in which the load factor may decrease or increase. Note that the load factor is the ratio of the load to its maximum capacity.

Figure 1:
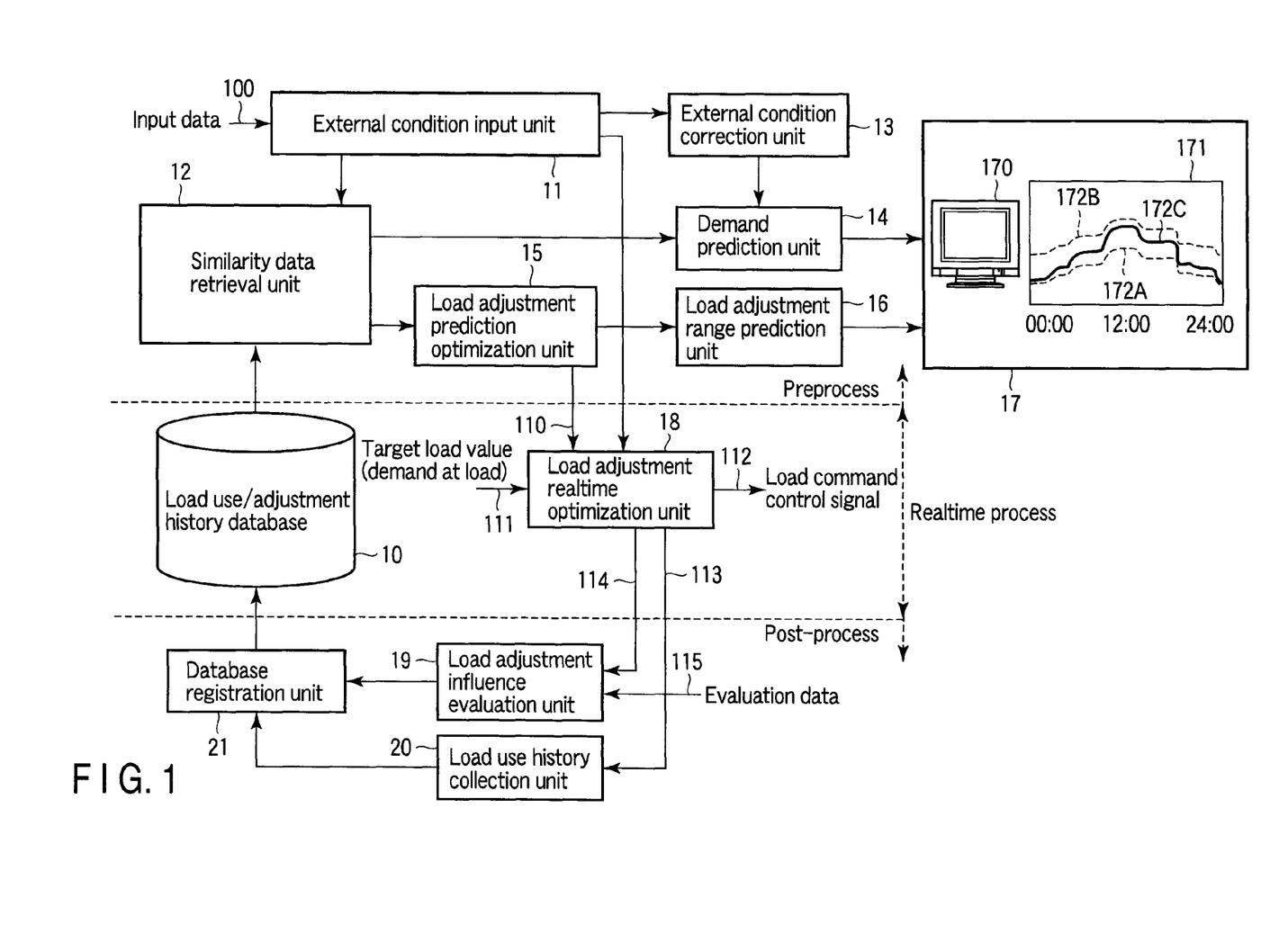
FIG. 1 is a block diagram showing the major components of an energy management system according to an embodiment of this invention.

As FIG. 1 shows, the system according to the embodiment has a load use/adjustment history database (hereinafter called database) 10, an external condition input unit 11, a similarity data retrieval unit 12, an external condition correction unit 13, a demand prediction unit 14, a load adjustment prediction optimization unit 15, a load adjustment range prediction unit 16, a terminal device 17, a load adjustment real time optimization unit 18, a load adjustment influence evaluation unit 19, a load use history collection unit 20, and a database registration unit 21.

The database 10 holds the data representing the history of the use and adjustment of loads. The external condition input unit 11 collects meteorological data such as weather, temperature and humidity, the use schedule data (e.g., calendar data) about the load equipment, and the like, and acquires the data as input data 100. The similarity data retrieval unit 12 retrieves similarity data indispensable for use and adjustment of the loads, on the basis of any date similar to the date that matches with the external conditions input at the external condition input unit 11.

The external condition correction unit 13 calculates a correction coefficient that will be used to correct a predicted demand, from the external condition input at the external condition input unit 11. The load adjustment prediction unit 14 receives, as predicted demand data, the similarity data (representing the actual load use on the similar date) the similarity data retrieval unit 12 has retrieved from the database 10. Further, the load adjustment prediction unit 14 receives the correction coefficient calculated by the external condition correction unit 13 and multiplies the predicted demand (i.e., predicted demand data) by the correction coefficient, thereby calculating a correct predicted demand.

The terminal device 17 has a display device 170. The display device 170 displays, on its screen 171, the predicted demand value 172C calculated by the load adjustment prediction unit 14. The terminal device 17 has an input device, in addition to the display device 170. Thus, the terminal device 17 is an input/output interface for the system and the user of the system.

Using the similarity data the similarity data retrieval unit 12 has retrieved from the database 10, the optimization unit 15 infers the effect of load adjustment (or cost coefficient), the load adjustment range (or adjustment range limitation condition), the load adjustment selection order (or priority order of load adjustment), and the influence of load adjustment (or adjustment dissatisfaction degree), from the load adjustment actually performed on a similar day. Further, the load adjustment prediction optimization unit 15 performs an optimization calculation based on the cost coefficient, the adjustment range restriction condition, and the like, in consideration of at least one index, thereby outputting the load adjustment candidate data representing several candidate of load adjustment that can be accomplished in practice. From the load adjustment candidate data output from load adjustment prediction optimization unit 15, the load adjustment range prediction unit 16 calculates a load adjustment range (or load adjustment limits). The data representing the load adjustment range is output to the terminal device 17.

The system configured as described above performs some processes (described later) before the load is actually adjusted or controlled. How the load is actually adjusted or controlled in real time will be explained below.

First, the load adjustment real time optimization unit 18 receives a load value desired at a given time (e.g., load control value based on the contracted power supply) and input data 111 that contains a load demand (e.g., request for use of a one-unit load). The load adjustment real time optimization unit 18 receives load adjustment candidate data 110 from the load adjustment prediction optimization unit 15. Using this data 110, the load adjustment real time optimization unit 18 performs an optimization calculation in the same way as does the load adjustment prediction optimization unit 15. The load adjustment real time optimization unit 18 outputs the result of this calculation, as a load command control signal 112. The load command control signal 112 controls each energy load (e.g., air conditioner).

The evaluation unit 19 receives the load adjustment result data 114 from the optimization unit 18 and receives evaluation data 115 externally input. On the basis of the data 114 and the data 115, the evaluation unit 19 evaluates the influence of the load adjustment. The data representing the load adjustment influence thus evaluated is output from the evaluation unit 19. Note that the adjustment influence evaluated includes the economic effect of load adjustment (i.e., cost reduction), the result of determining whether the load can be adjusted within a given range (that is, whether the adjustment range restriction condition is reasonable), the result of determining whether the order of adjusting loads is reasonable) and the adjustment dissatisfaction degree. The load use history collection unit 20 receives actual load use record data 113 based on the load control signal 112 output from the optimization unit 18. The actual load use record data 113 is transferred to the database registration unit 21. The database registration unit 21 registers, in the database 10, the actual load use record data 113 and the load adjustment influence data output from the evaluation unit 19.

(Advantages of the System)

Figure 3:
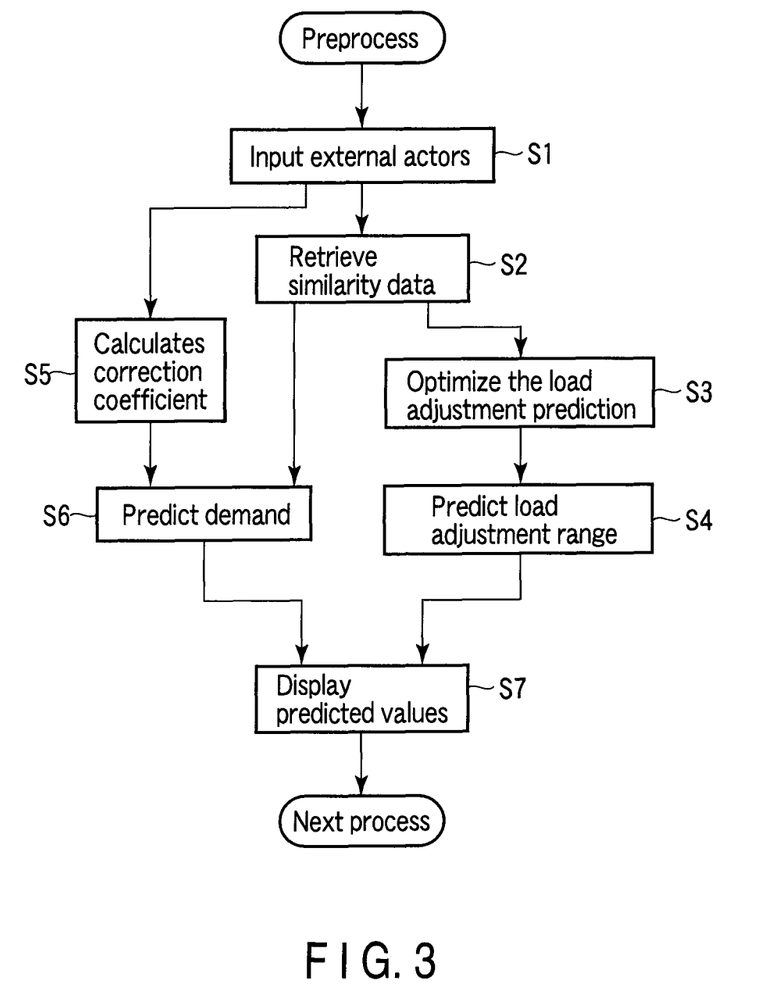
FIG. 3 is a flowchart explaining the sequence of predicting a range in which to adjust a load in the embodiment.
Figure 4:
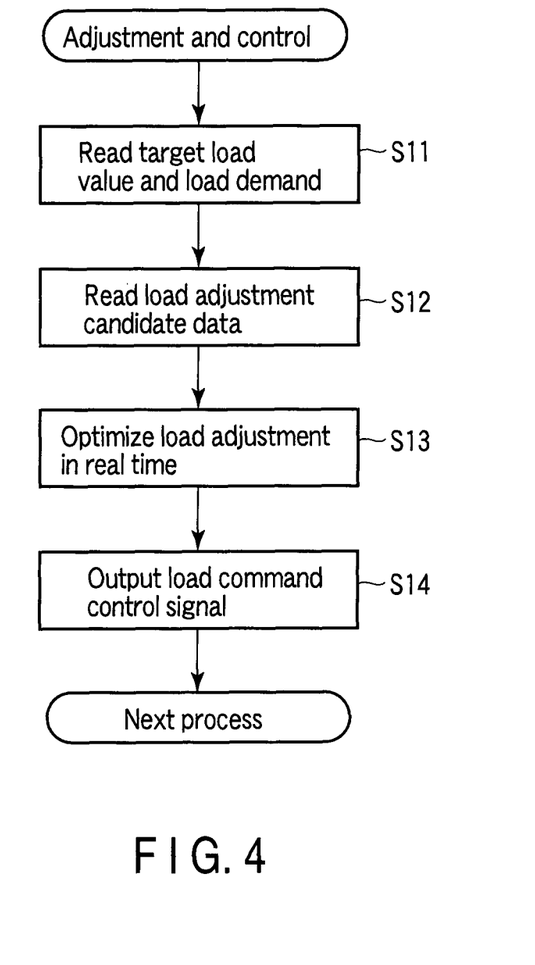
FIG. 4 is a flowchart explaining the sequence of adjusting and controlling a load in the embodiment.
Figure 5:
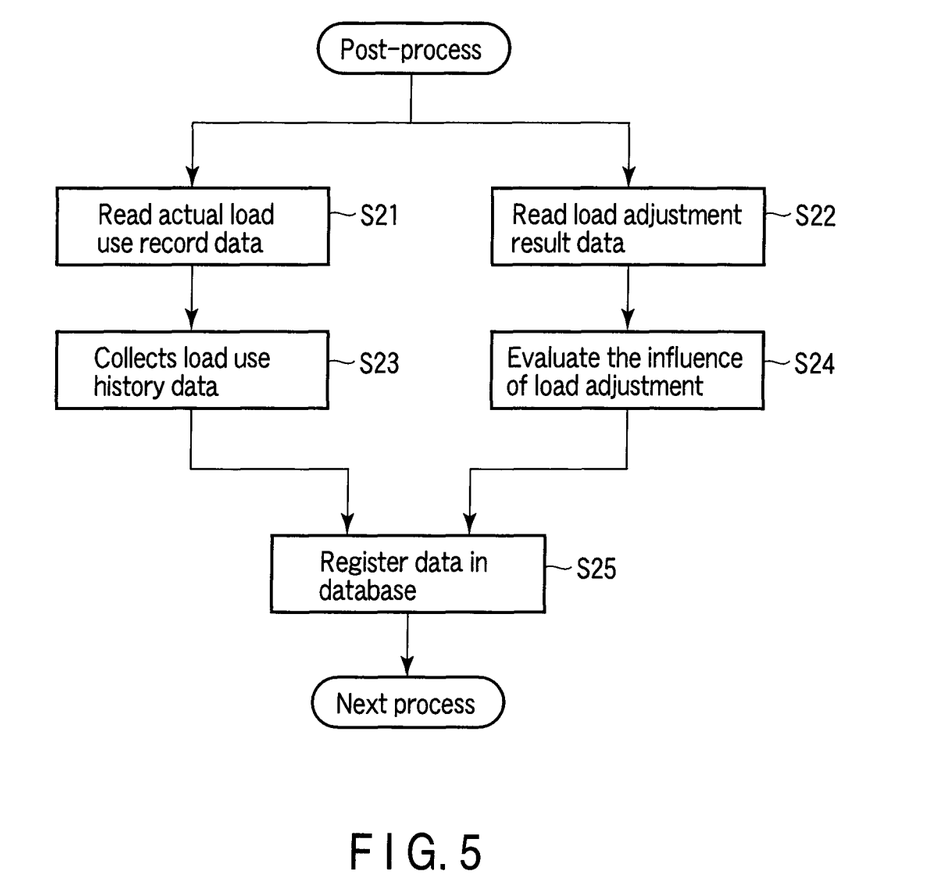
FIG. 5 is a flowchart explaining the sequence of evaluating the load adjustment performed in the embodiment.

The advantages of the system according to the embodiment will be explained, with reference to the flowcharts of FIG. 3 to FIG. 5.

Figure 2:
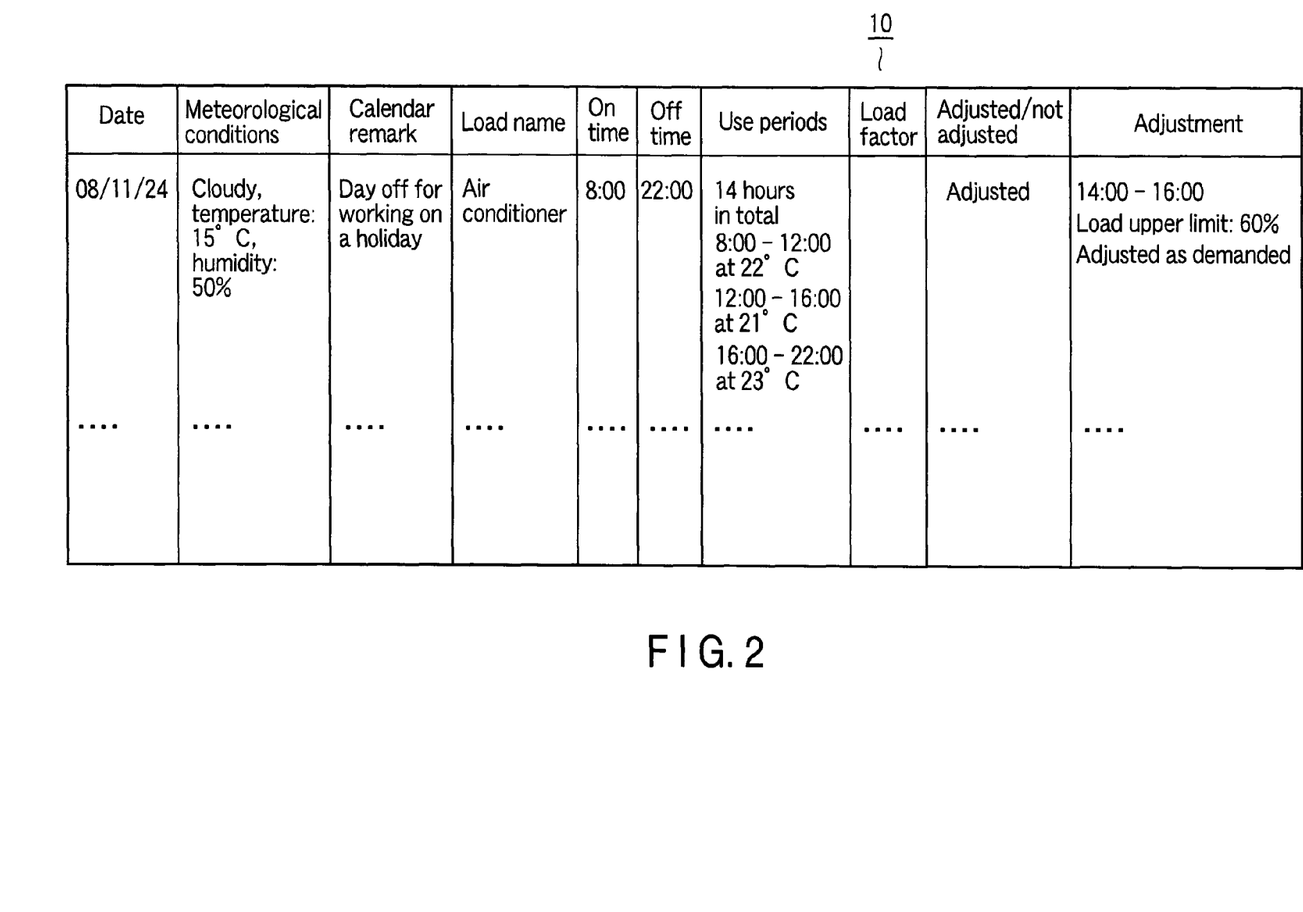
FIG. 2 is a diagram representing an example of data stored in the database provided in the embodiment.

The database 10 stores the history data that represents how the loads, including an air conditioner, were used and adjusted in the past. As shown in FIG. 2, the history data represents the day when the air conditioner was used, the meteorological conditions of that day (weather, temperature, humidity, etc.), the calendar remarks for that day (e.g., day off for working on a holiday), the name of load, the turn-on time and turn-off time of load, the use duration of load, the load factor (ratio of load to the rated value (100%)), the adjustment record (showing whether the load was adjusted or not), and the result of load adjustment. The adjustment record shows, for example, that the air conditioner was driven at the load upper limit of 70% in the peak use period from 14:00 to 16:00 and that as much power as demanded was supplied to the air conditioner.

How the range in which to adjust a load is predicted before the load is adjusted in the system will be explained with referenced to the flowchart of FIG. 3.

The external condition input unit 11 collects meteorological data such as weather, temperature and humidity, the use schedule data about the loads (e.g., calendar data), and the like, and acquires this data as input data 100 (Step S1). The similarity data retrieval unit 12 retrieves similarity data indispensable for use and adjustment of the load, on the basis of any date similar to the date that matches with the external conditions input at the external condition input unit 11 (Step S2).

The external condition correction unit 13 calculates a correction coefficient that will be used to correct a predicted demand, from the external condition input at the external condition input unit 11 (Step S5). The external condition is, for example, the temperature difference between the present date and the similar date in the past. The load adjustment prediction unit 14 receives the similarity data (representing the actual load use on the similar date) the similarity data retrieval unit 12 has retrieved from the database 10, and receives the correction coefficient calculated by the external condition correction unit 13. The load adjustment prediction unit 14 then multiplies the predicted demand by the correction coefficient, calculating a corrected predicted demand (Step S6).

Meanwhile, the load adjustment prediction optimization unit 15 uses the similarity data the similarity data retrieval unit 12 has retrieved from the database 10, thereby inferring the effect (or cost coefficient) of the load adjustment performed on a similar day, the load adjustment range (or adjustment range limitation condition), the load adjustment selection order (or priority order of load adjustment), and the influence of load adjustment (or adjustment dissatisfaction degree) from. Further, the load adjustment prediction optimization unit 15 performs an optimization calculation based on the cost coefficient and the adjustment range restriction condition and the like, in consideration of at least one index, thereby outputting the load adjustment candidate data representing several candidate of load adjustment that can be accomplished in practice (Step S3). From the load adjustment candidate data output from the load adjustment prediction optimization unit 15, the load adjustment range prediction unit 16 calculates a load adjustment range (or load adjustment limits) (Step S4). The load adjustment range will be used as predicted load adjustment range.

As shown in FIG. 1, the display device 170 of the terminal device 17 displays, on its screen 171, the predicted demand value 172C calculated by the load adjustment prediction unit 14 and the load adjustment range predicted (or calculated) by the load adjustment range prediction unit 16 (Step S7). The predicted load adjustment value represents the load adjustment range defined by lower limit 172A (i.e., demand-load power decrease) and upper limit 172B (i.e., demand-load power increase). The "load power decrease" is the value by which the power for the load is decreased when the energy available is insufficient. The "load power increase" is the value by which the power for the load is increased when the energy available is excessive. Thus, the load adjustment consists in adjusting the power supplied to, the operating time of, and the activation timing of, for example, an air conditioner.

The load factor is the ratio of the load to its maximum capacity. An increase in the load factor can reduce the maximum power (e.g., the contracted power supply to the household). The maximum power (contracted power supply) can be reduced if the peak load period is eliminated, thereby rendering the load constant, because the maximum power (contracted power supply) depends on the peak value in most cases. As a result, the overall load factor increases. This can improve the use efficiency of the equipment over a long period of time.

The sequence in which the system controls and adjusts an energy load, or performs a load adjustment process in real time, will be explained with reference to the flowchart of FIG. 4.

The optimization unit 18 reads the input data 111 that contains a target load value (e.g., load restriction value based on the contracted power supply) and a load demand (e.g., request for use of a one-unit load) (Step S11). The optimization unit 18 reads the load adjustment candidate data 110, too, from the load adjustment prediction optimization unit 15 (Step S12). Using this data 110, the optimization unit 18 performs an optimization calculation in the same way as does the load adjustment prediction optimization unit 15. The optimization unit 18 outputs the result of this calculation, as a load command control signal 112 (Steps S13 and S14). In accordance with the load command control signal 112, the load command control signal 112 controls each energy load (e.g., air conditioner).

The sequence of evaluating the energy load adjustment after the load has been adjusted in the system will be explained with reference to the flowchart of FIG. 5.

The load use history collection unit 20 reads the actual load use record data 113 based on the load command control signal 112 output from the optimization unit 18 (Step S21). The load use history collection unit 20 collects actual load use record data 113 as load use history data, and outputs the load use history data to the database registration unit 21 (Step S23).

In the meantime, the evaluation unit 19 reads the load adjustment result data 114 from the optimization unit 18 (Step S22). The evaluation unit 19 receives not only the load adjustment result data 114, but also the evaluation data 115. On the basis of the data 114 and the data 115, the evaluation unit 19 evaluates the influence of the load adjustment (Step S24). The result of evaluation represents the economic effect of load adjustment (i.e., cost reduction), the result of determining whether the load can be adjusted within a given range (that is, whether the adjustment range restriction condition is reasonable), the result of determining whether the order of adjusting loads is reasonable) and the adjustment dissatisfaction degree, and the like.

The database registration unit 21 registers, in the database 10, the load use history data collected by the load use history collection unit 20 and the data output from the evaluation unit 19 and representing the result of evaluation (Step S25).

As described above, the system according to the embodiment performs the function of predicting the range in which to adjust an energy load and then displaying the range predicted. The system can therefore accomplish a flexible energy management, by performing effective demand-side management (DSM) in accordance with the energy required at any load and condition of the load. In order to predict the range in which to adjust the energy load, the load adjustment prediction optimization unit 15 performs an optimization calculation based on the cost coefficient, the adjustment range restriction condition, the priority order of load adjustment, the adjustment dissatisfaction degree, and the like. The optimization calculation is performed in consideration of the shift of the load use timing, the shortening or lengthening of the load use period, the increase or decrease of load factor (i.e., operating point), the moderation of changes at the time of connecting or disconnecting the load (i.e., cutting of surge current, start-up peak in the air conditioner, etc.), the coordinated operation of loads, the interruption of load starting/stopping, the forced load stopping/starting, and the like. Hence, the system can perform a meticulous and flexible DSM in consideration of the various conditions of each load, and can reduce the labor and cost of the person who uses the load.

Moreover, in the system according to the embodiment the database 10 accumulates the history data representing the use history of the loads and the actual load use record data. The database 10 therefore constitutes a so-called load adjustment model database. Using the load adjustment model database, the ranges in which to adjust the respective energy loads are inferred in the system. Therefore, the system can learn the control logic of DSM for each load and for the use condition thereof. Further, the system according to the embodiment can cope with external factors such as weather, season, use mode of the load. Still further, the effects of the DSM, such as energy saving, $CO_2$ reduction and cost reduction, can be quantitatively and visually recognized, because of the function of displaying the result of predicting the load adjustment.

To summarize the foregoing, the system according to the embodiment can effectively use DSM to achieve use management of loads and the supply-and-demand control in each load, if it is applied to an energy management system such as microgrid. As a result, the system can control $CO_2$ emission by effectively using reproducible energy, can increase the use efficiency of power generation equipment by performing load leveling and using the load outside any peak use period, and can reduce the capacity of the energy adjusting equipment (e.g., non-utility generation units, fuel cells and power storage devices) by performing a flexible supply-and-demand control. In other words, the energy management system according to the embodiment can perform an effective load adjustment function in accordance with the energy required at the loads and conditions of the loads, thereby leveling the energy demanded at the loads and optimizing the energy use efficiency.

(Application of the Embodiment)

Figure 6A:
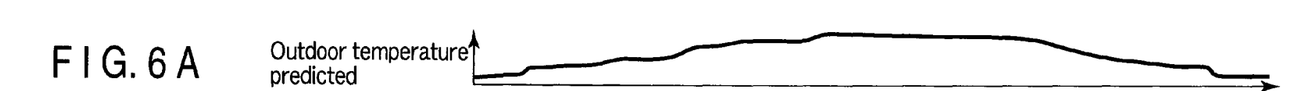
FIGS. 6A, 6B, 6C, 6D, 6E and 6F are a timing chart illustrating an exemplary method of predicting load adjustment in the embodiment.
Figure 6B:
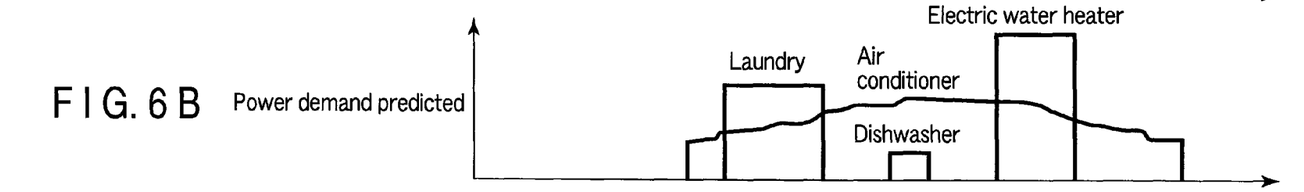
Figure 6C:
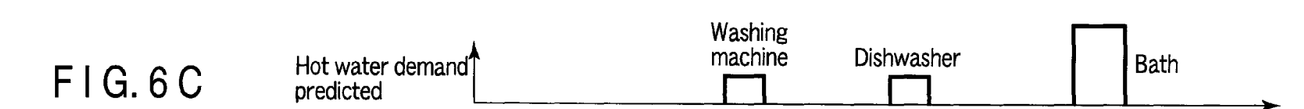
Figure 6D:
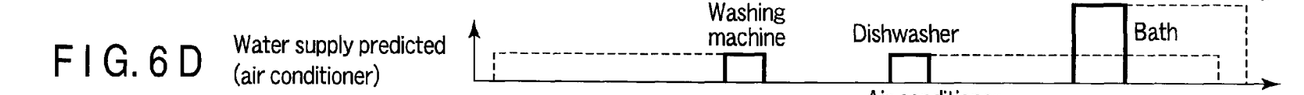
Figure 6E:
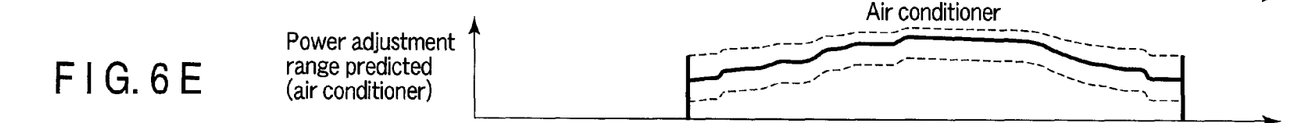
Figure 6F:
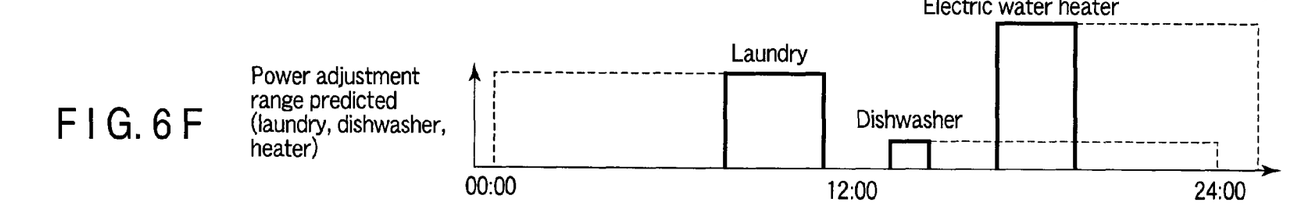
Figures 7A, 7B:
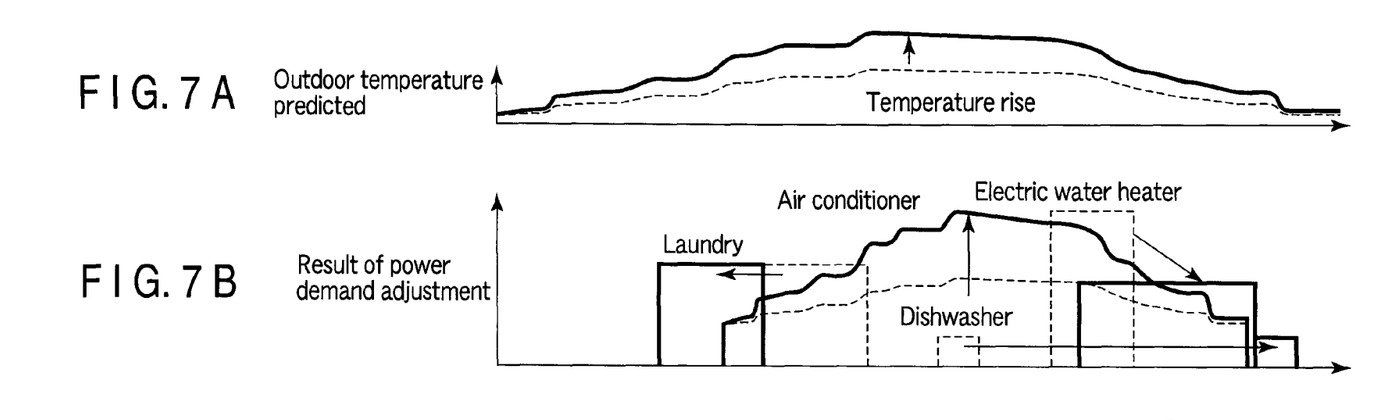
FIGS. 7A, 7B and 7C are a timing chart illustrating an exemplary result of the load adjustment performed in the embodiment.
Figure 7C:
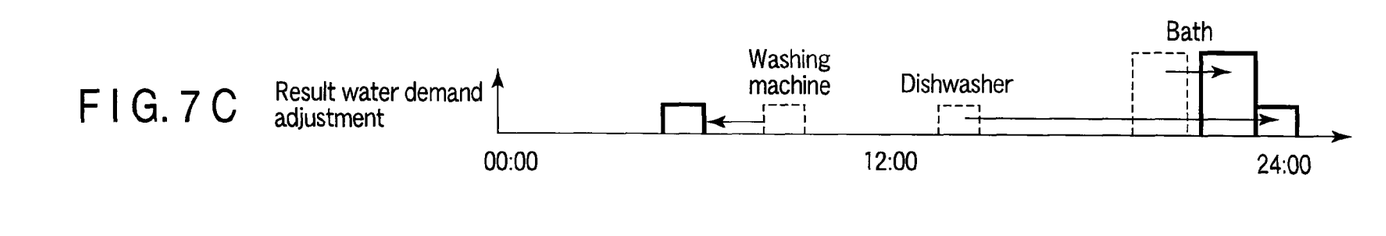
Figure 8:
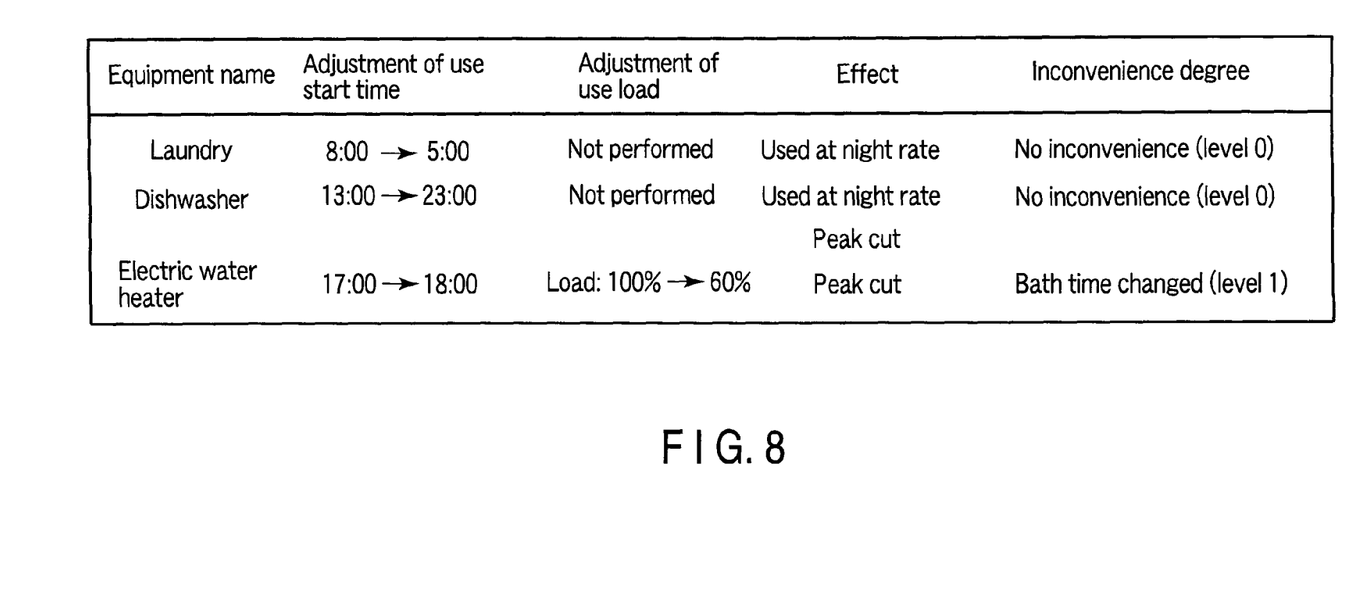
FIG. 8 is a diagram showing an exemplary result of evaluating the load adjustment performed in the embodiment.

FIGS. 6A to 6F, FIGS. 7A to 7C an FIG. 8 are diagrams for explaining an exemplary energy management system according to the embodiment.

This system is designed on the assumption that the representative household equipment pieces are an air conditioner, a washing machine (laundry), a dishwasher, an electric water heater, and a bath. Of these equipment pieces, the air conditioner, laundry, dishwasher and electric water heater are load that consume electric power, and the laundry, dishwasher and bath are load that consume hot water. Only the air conditioner is considered unable to control in terms of load, because its load depends on an external condition (i.e., outdoor temperature).

FIGS. 6A to 6F are a timing chart illustrating how the loads are used on a certain day. From the database 10, similarity data is retrieved in accordance with the season, temperature and day of the week. On the basis of the similarity data, the ranges in which to adjust the respective loads are predicted. FIG. 6A shows the outdoor temperature predicted from the similarity data. FIG. 6B shows the power demands predicted from the similar data, or the amounts of power that the air conditioner, laundry, dishwasher and electric water heater, may consume in normal operating mode.

FIG. 6C shows the hot water demands predicted from the similarity data, or amounts of hot water that the laundry, dishwasher and bath may use in normal use mode. FIG. 6E is a predicted range in which to adjust the power consumed in the air conditioner. FIG. 6F is predicted ranges in which to adjust the power consumed in the laundry, dishwasher and electrical water heater.

In FIGS. 6E and 6F, the broken lines indicate how the use states of the respective loads changed for the several similar days in the past. More precisely, the broken lines in FIG. 6E indicate how the load changed in the air conditioner changed, and the broken lines in FIG. 6F indicate how the loads changed in the laundry, dishwasher and water heater. The change in each load in the past is inferred as a value (load adjustment range) by which the load can be adjusted.

Next, such an evaluation function J as given by the following equation (1) is set in order to optimize the load adjustment prediction. Formulae (2) to (4) given below represent the conditions that should be taken into account in an optimization calculation of minimizing the evaluation function J.

$$J = \sum_{t=1}^{24} (PCt) \tag{1}$$

$$P\max \leq Pcom \tag{2}$$

$$0 \leq K \leq C\max \tag{3}$$

$$K = Kp + \sum_{t=1}^{K} (G(t) - D(t)) \tag{4}$$

In the formulae (1) to (4), PCt is the total power cost at time t, Pmax is the maximum power at any time, Pcom is the contract power supplied from the commercially available power supply, K is the amount of hot water in the tank, and Cmax is the maximum capacity, Kp is the initial amount of hot water in the tank, G(t) is amount of hot water accumulated per unit time, and D(t) is amount of hot water used per unit time.

As the optimization calculation is performed, minimizing the evaluation function J, such a load adjustment scenario as shown in FIGS. 7A to 7C can be formulated.

FIG. 7A shows how much the outdoor temperature (solid line) is higher than that (broken line) on a similar day in the past. Based on the difference between these temperatures, the predicted power demand in the air conditioner is corrected. In the conventional method of predicting the power demand, the maximum power Pmax inevitably surpasses the contract power. By contrast, the load adjustment scenario based on the result of the optimization calculation described above is the result of adjusting the power demand in the air conditioner, which is indicated by the solid line in FIG. 7B. The laundry, dishwasher, electric water heater and bath are used in accordance with such hot water demands as indicated by solid lines in FIG. 7C.

More specifically, the laundry is operated at 5:00, not at 8:00, or outside the peak use period, so that power may be consumed at the night rate lower than the daytime rate. Similarly, the dishwasher is operated at 23:00, not at 13:00, or outside the air-conditioner peak use period. This results in a shift of the period in which hot water is much used. In accordance with this shift, the electric water heater is operated at 18:00, not at 17:00 and at 60% of its maximum ability (100%). In this case, the bath time is changed from 19:00 to 21:00.

Thus, a load adjustment scenario has been prepared, which minimizes the evaluation function J in response to the temperature change, i.e., change of an external factor. Further, a plurality of load adjustment scenarios are formulated from the change in the outdoor temperature predicted for the day. These scenarios are displayed on the screen 171 of the display device 170, as is illustrated in FIG. 1. That is, the load adjustment limits predicted for the load is calculated, together with the overall demand predicted for the load.

The load is operated after the load has been adjusted in accordance with the scenario for the day. The evaluation unit 19 evaluates the influence of the load adjustment, and generates data shown in FIG. 8, which represents the evaluated influence of the load adjustment. The laundry and the dishwasher are adjusted in terms of the use start time only. As seen from FIG. 8, no problems arose from the load adjustment (inconvenience level 0) when these loads were used at the night rate and outside any peak use period. The electric water heater is controlled in terms of the use start time and the power it consumes, achieving a peak-cut effect. By contrast, this load adjustment results in inconvenience (level 1), because the bath cannot be used until 21:00, because the bath time must be changed from 19:00 to 21:00. The data representing the inconvenience level is recorded in the database 10 by the database registration unit 21.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An energy management system comprising:
a database configured to store history data about load adjustment;
a demand prediction unit configured to predict a demand at a load to which energy is supplied;
a load adjustment range prediction unit configured to calculate a load adjustment range by using the history data stored in the database, the load adjustment range being defined by lower limit and upper limit of load adjustment limits for the predicted demand, the lower limit being based on the demand and load power decrease, the upper limit being based on the demand and load power increase; and
a display unit configured to display the demand predicted by the demand prediction unit and the load adjustment range calculated by the load adjustment range prediction unit.

2. The system according to claim 1, wherein the display unit displays the load adjustment range calculated by the load adjustment range prediction unit.

3. The system according to claim 1, further comprising a load adjustment prediction optimization unit configured to perform an optimization calculation using the history data stored in the database, in consideration of at least one indices including a cost coefficient, an adjustment range restriction condition, a priority order of load adjustment, and a adjustment dissatisfaction degree.

4. The system according to claim 1, wherein the load adjustment range prediction unit calculates the load adjustment range for each load, in order to adjust the load by performing any one of, or any combination of, shifting of the load use timing, shortening or lengthening of the load use period, increasing or decreasing of a load factor, moderating changes at the time of connecting or disconnecting the load, coordinating operation of the loads, interrupting of load stopping or starting, and forcing load stopping or starting.

5. The system according to claim 1, further comprising a load adjustment prediction optimization unit configured to perform an optimization calculation using the history data stored in the database, in consideration of at least one indices including a cost coefficient, an adjustment range restriction condition, a priority order of load adjustment and a adjustment dissatisfaction degree, the load adjustment prediction optimization unit performing the optimization calculation on each load adjusting means.

6. The system according to claim 4, further comprising a database registration unit configured to register the load adjustment range predicted by the load adjustment range prediction unit, as the history data, in the database.

7. The system according to claim 1, further comprising a unit configured to correct the load adjustment range predicted by the load adjustment range prediction unit, in accordance with external factors including weather, season, use mode of the load.

8. The system according to claim 1, which is applied to a microgrid that has the function of performing demand-side management.

9. An energy management method for use in an energy management system having a database configured to store history data about load adjustment and a demand prediction unit configured to predict a demand at a load to which energy is supplied, the method comprising:
calculating a load adjustment range by using the history data stored in the database, the load adjustment range being defined by lower limit and upper limit of load adjustment limits for the predicted demand, the lower limit being based on the demand and load power decrease, the upper limit being based on the demand and load power increase; and
displaying the demand predicted by the demand prediction unit and the calculated load adjustment range.

* * * * *

UNITED STATES PATENT AND TRADEMARK OFFICE
CERTIFICATE OF CORRECTION

PATENT NO.         : 8,543,248 B2                                           Page 1 of 1
APPLICATION NO.    : 12/694663
DATED              : September 24, 2013
INVENTOR(S)        : Iino et al.

It is certified that error appears in the above-identified patent and that said Letters Patent is hereby corrected as shown below:

In the claims:

Claim 3, column 10, lines 16-17, change "a adjustment" to --an adjustment--.

Claim 5, column 10, lines 32-33, change "a adjustment" to --an adjustment--.

Signed and Sealed this
Twenty-eighth Day of January, 2014

Michelle K. Lee
*Deputy Director of the United States Patent and Trademark Office*